(12) United States Patent
Strom et al.

(10) Patent No.: US 8,386,251 B2
(45) Date of Patent: Feb. 26, 2013

(54) PROGRESSIVE APPLICATION OF KNOWLEDGE SOURCES IN MULTISTAGE SPEECH RECOGNITION

(75) Inventors: Nikko Strom, Kirkland, WA (US); Julian Odell, Seattle, WA (US); Jon Hamaker, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 933 days.

(21) Appl. No.: 12/479,986

(22) Filed: Jun. 8, 2009

(65) Prior Publication Data

US 2010/0312557 A1    Dec. 9, 2010

(51) Int. Cl.
 *G10L 17/00* (2006.01)
(52) U.S. Cl. ........ 704/246; 704/278; 704/277; 704/261; 704/260; 704/256.2; 704/255; 704/252; 704/249; 704/247; 704/245; 704/244; 704/240; 704/233; 704/231; 704/2; 702/141; 382/224; 379/406.01
(58) Field of Classification Search ............ 70/247, 70/255, 267; 704/247, 255, 267, 278, 277, 704/261, 260, 256.2, 252, 249, 245, 244, 704/240, 233, 231, 2; 702/141; 382/224; 379/406.01
See application file for complete search history.

(56) References Cited

U.S. PATENT DOCUMENTS

| | | | |
|---|---|---|---|
| 5,479,488 A | 12/1995 | Lennig et al. | |
| 5,737,724 A | 4/1998 | Atal et al. | |
| 5,960,397 A * | 9/1999 | Rahim | 704/244 |
| 6,073,096 A * | 6/2000 | Gao et al. | 704/245 |
| 6,122,361 A | 9/2000 | Gupta | |
| 6,182,037 B1 * | 1/2001 | Maes | 704/247 |
| 6,751,595 B2 | 6/2004 | Busayapongchai et al. | |
| 6,757,652 B1 | 6/2004 | Lund et al. | |
| 6,868,381 B1 * | 3/2005 | Peters et al. | 704/249 |
| 6,973,429 B2 | 12/2005 | Smith | |
| 6,996,519 B2 | 2/2006 | Franco et al. | |
| 7,006,971 B1 | 2/2006 | Stahl et al. | |
| 7,184,957 B2 | 2/2007 | Brookes et al. | |
| 7,216,077 B1 * | 5/2007 | Padmanabhan et al. | 704/240 |
| 7,308,404 B2 | 12/2007 | Venkataraman et al. | |
| 7,401,017 B2 | 7/2008 | Murveit et al. | |
| 7,548,651 B2 * | 6/2009 | Shozakai et al. | 382/224 |
| 7,567,903 B1 * | 7/2009 | Goffin et al. | 704/261 |
| 7,729,912 B1 * | 6/2010 | Bacchiani et al. | 704/252 |
| 2002/0087314 A1 * | 7/2002 | Fischer et al. | 704/255 |
| 2002/0138265 A1 | 9/2002 | Stevens et al. | |
| 2004/0199393 A1 * | 10/2004 | Arizmendi et al. | 704/277 |
| 2005/0131688 A1 * | 6/2005 | Goronzy et al. | 704/240 |
| 2005/0234723 A1 | 10/2005 | Arnold et al. | |
| 2005/0240409 A1 | 10/2005 | Gallistel | |

(Continued)

OTHER PUBLICATIONS

Srinivasmurthy, et al. "Efficient Scalable Encoding for Distributed Speech Recognition", Retrieved at<<http://citeseerx.ist.psu.edu/viewdoc/download?doi=10.1.1.107.4383&rep=rep1&type=pdf>>, Speech Communication 48 (2006) 888-902, pp. 15.

(Continued)

*Primary Examiner* — Michael Colucci
(74) *Attorney, Agent, or Firm* — Turk IP Law, LLC (57) ABSTRACT

A speech recognition system is provided with iteratively refined multiple passes through the received data to enhance the accuracy of the results by introducing constraints and adaptation from initial passes into subsequent recognition operations. The multiple passes are performed on an initial utterance received from a user. The iteratively enhanced subsequent passes are also performed on following utterances received from the user increasing an overall system efficiency and accuracy.

16 Claims, 7 Drawing Sheets

U.S. PATENT DOCUMENTS

| | | | |
|---|---|---|---|
| 2006/0149558 A1* | 7/2006 | Kahn et al. ................. | 704/278 |
| 2006/0206333 A1* | 9/2006 | Paek et al. ................. | 704/260 |
| 2006/0259294 A1 | 11/2006 | Tashereau | |
| 2007/0033027 A1* | 2/2007 | Yao ............................ | 704/233 |
| 2007/0124057 A1 | 5/2007 | Prieto et al. | |
| 2007/0225970 A1 | 9/2007 | Kady et al. | |
| 2008/0082334 A1 | 4/2008 | Watson | |
| 2008/0120091 A1* | 5/2008 | Waibel et al. ................. | 704/2 |
| 2008/0147399 A1 | 6/2008 | Jaiswal et al. | |
| 2008/0147404 A1* | 6/2008 | Liu et al. ................ | 704/256.2 |
| 2008/0189106 A1 | 8/2008 | Low et al. | |
| 2008/0208577 A1 | 8/2008 | Jeong et al. | |
| 2010/0076757 A1* | 3/2010 | Li et al. ..................... | 704/233 |
| 2010/0226491 A1* | 9/2010 | Conte et al. ............. | 379/406.01 |
| 2011/0035215 A1* | 2/2011 | Sompolinsky et al. ....... | 704/231 |
| 2011/0054910 A1* | 3/2011 | Fujihara et al. ............. | 704/278 |
| 2011/0213582 A1* | 9/2011 | Naya ......................... | 702/141 |

OTHER PUBLICATIONS

Pellom, et al."Recent Improvements in the CU Sonic ASR System for Noisy Speech: the Spine Task", Retrieved at<<http://www.inf.ed.ac.uk/resources/nlp/local_doc/sonic-icassp2003-pub1.pdf>>, pp. 4.

Vogt, et al."Improving Automatic Emotion Recognition from Speech via Gender Differentiation", Retrieved at<<http://mm-werkstatt.informatik.uni-augsburg.de/files/publications/124/lrec06.pdf>>, pp. 4.

Woodland, et al."Iterative Unsupervised Adaptation using Maximum Likelihood Linear Regression", Retrieved at<<ftp://svr-ftp.eng.cam.ac.uk/pub/reports/woodland_icslp96.pdf>>, pp. 4.

Chen, et al."Automatic Accent Identification Using Gaussian Mixture Models", Retrieved at<<http://www.google.com/url?sa=t&source=web&ct=res&cd=1&url=http%3A%2F%2Fanthony.t.chen.googlepages.com%2Ftchen01-asru.pdf&ei=S1HwSfD-HYzMjAfhu63WDA&usg=AFQjCNHkl0zGe9xlvbjHyXoloinptpyGXQ>>, pp. 4.

Lamel, et al."Automatic Speech Recognition in CHIL", Retrieved at<<http://domino.research.ibm.com/comm/research_people.nsf/pages/gerasimos.potamianos.pubs.html/$FILE/J.CHIL08.ASR.pdf>>, pp. 18.

Non-Final Office Action for U.S. Appl. No. 12/042,460, filed Mar. 5, 2008, mailed Mar. 2, 2011.

Final Office Action for U.S. Appl. No. 12/042,460, filed Mar. 5, 2008, mailed Sep. 29, 2011.

Chung et al. "Automatic Acquisition of Names Using Speak and Spell Mode in Spoken Dialogue Systems" 2003. Corporation for National Research Initiatives, 8 pages, Reston, VA. http://people.csail.mit.edu/seneff/hlt-2003.pdf.

Chen et al. "A*-Admissible Key-Phrase Spotting with Sub-Syllable Level Utterance Verification" 1998. Dept of Computer Science and Information Engineering, National Taiwan University. 4 pages, Taipei, Taiwan, Republic of China. http://citeseerx.ist.psu.edu/viewdoc/summary?doi=10.1.1.51.4829.

Kim et al. "Improving Speech Recognition Using Semantic and Reference Features in a Multimodal Dialog System" Proceedings of the 16th IEEE International Symposium on Robot and Human Interactive Communication (IEEE Roman 2007), Aug. 2007 http://isoft.postech.ac.kr/publication/iconf/roman07_kim(b).pdf.

* cited by examiner

PROGRESSIVE APPLICATION OF KNOWLEDGE SOURCES IN MULTISTAGE SPEECH RECOGNITION

BACKGROUND

With the proliferation of speech recognition technologies from controlling appliances to Interactive Voice Response (IVR) systems, speed and accuracy of speech recognition applications are important design parameters. One of the challenges in speech recognition is the diversity of received audio. Depending on a language, dialect, gender of the speaker, the recording environment, and comparable characteristics, received audio may vary significantly. System developers employ one or more algorithms to detect different characteristics of the audio received from a speaker in conjunction with training models like acoustic models, language models, and similar ones.

Many algorithms for improving automatic speech recognition accuracy require some amount of speech from the speaker to be effective. For example, accuracy can be improved by detecting the dialect of the speaker and modify the system accordingly. Such algorithms often require recognition results from the same speaker as input. Thus, these algorithms typically cannot be applied to the first or first few utterances that the system is exposed to. Therefore automatic speech recognition accuracy is initially lower since the enhancing algorithms cannot be used effectively.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a speech recognition system that employs iterative refinement and multiple passes through the received data to enhance the accuracy of the results by introducing constraints and adaptation from initial passes into subsequent recognition passes. The multiple passes are performed on an initial utterance received from a user according to one embodiment. According to another embodiment, the iteratively enhanced subsequent passes are also performed on following utterances received from the user increasing an overall system efficiency and accuracy.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, iteratively refined multiple passes of speech recognition may be performed on a first utterance received from a user increasing system accuracy and efficiency. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "server" generally refers to a computing device executing one or more software programs typically in a networked environment. However, a server may also be implemented as a virtual server (software programs) executed on one or more computing devices viewed as a server on the network. More detail on these technologies and example operations is provided below. Also, the term "engine" (as in speech recognition engine) is used to refer to a self contained software application that has input(s) and an output(s).

Figure 1:
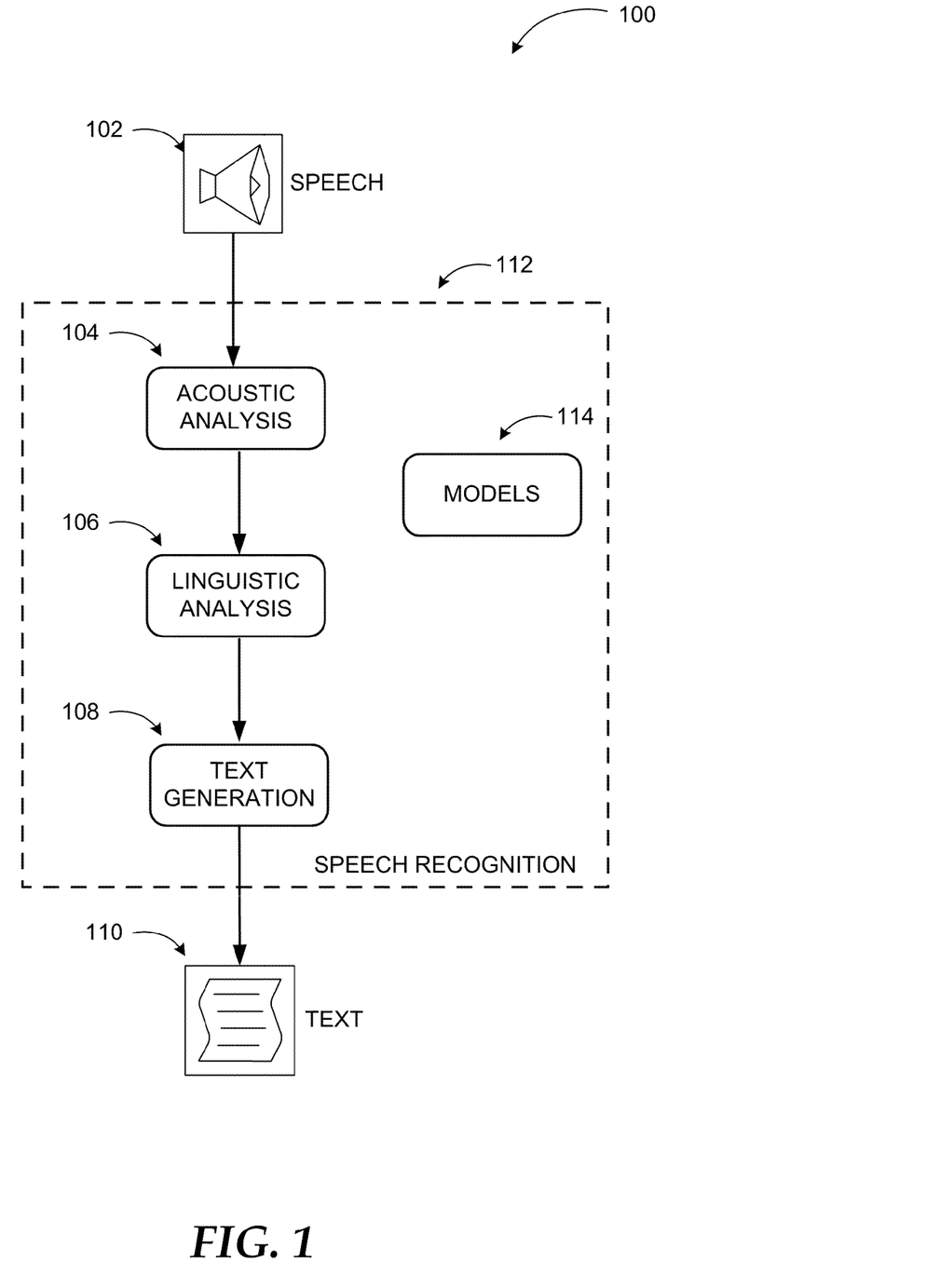
FIG. 1 is a conceptual high level diagram of a speech recognition system.

FIG. 1 is a block diagram illustrating top level components in a speech recognition system. Speech recognition system 112 begins the process of speech recognition by receiving speech input 102. The audio signal is provided to acoustic analysis module 104 and linguistic analysis 106, followed by generation of textual data 110 by text generation module 108. Speech recognition system 112 recognizes words, phrases, and the like, based on customized language and acoustic models (114). The consumption of the recognized audio and the recognition processes may be an interactive one, according to some embodiments, where user feedback for selection or correction of a recognized portion of the received speech is received before the entire utterance is recognized.

In a typical implementation, speech recognition process takes in audio input and provides textual output, although other forms of output may also be employed such as input (e.g. commands) for various software programs, process control mechanisms, and comparable outputs without the intermediate step of constructing a textual representation. In recognizing utterances, a speech recognition system may utilize a language model and an acoustic model. The language model may be generated and/or adapted through statistical modeling of words, phrases, fragments, etc. that form a user's profile. Statistical data from user language model statistics and a generic language model may be used in generating the adapted language model customized for the particular user's profile.

The acoustic model may be based on live or stored audio recordings by the users, which are used for generating statistics data to adapt a generic acoustic model to the customized acoustic model. The acoustic and language models are then used by the speech recognition process to generate textual data for processing by other applications.

Components of the speech recognizing system may be loaded into a server, executed over a distributed network, executed in a client device, and the like. Furthermore, the components described above are for illustration purposes only, and do not constitute a limitation on the embodiments. A speech recognizing system may be implemented using fewer or additional components in various orders such as additional models (e.g. confidence models). Individual components may be separate applications, or part of a single application. The speech recognition system or its components may include individually or collectively a user interface such as a web service, a Graphical User Interface (GUI), and the like.

Figure 2:
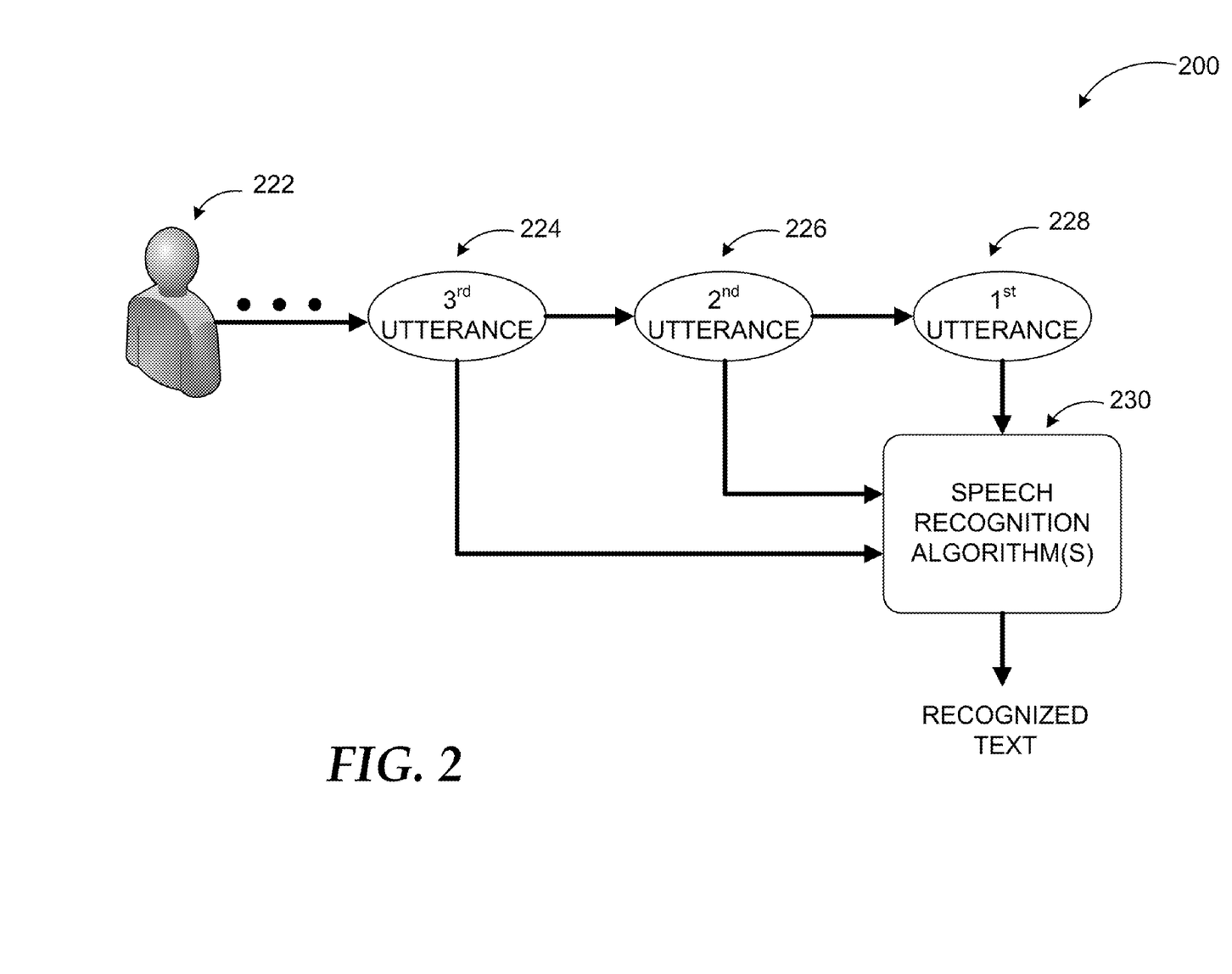
FIG. 2 is a diagram illustrating application of speech recognition algorithms on multiple utterances in an example speech recognition system.

FIG. 2 includes diagram 200 illustrating application of speech recognition algorithms on multiple utterances in an example speech recognition system. Speech recognition (also known as automatic speech recognition) converts spoken words to machine-readable input. While many different systems are used in speech recognition processes, modern general-purpose speech recognition systems are commonly based on Hidden Markov Models (HMMs). These are statistical models which output a sequence of symbols or quantities. In employing HMMs, speech signal is viewed as a piecewise stationary signal or a short-time stationary signal. Thus in a short-time in the range of a few milliseconds, speech is approximated as a stationary process.

Another feature of HMMs is that they can be trained automatically. In speech recognition, the hidden Markov model outputs a sequence of n-dimensional real-valued vectors (with n being a small integer, such as 10), outputting one of these every 10 milliseconds. The vectors consist of coefficients obtained by taking a Fourier transform of a short time window of speech and de-correlating the spectrum using a cosine transform, then taking the first (most significant) coefficients. The HMM has in each state a statistical distribution that is a mixture of diagonal covariance Gaussians, which provides a likelihood for each observed vector. Each word or each phoneme has a different output distribution; a hidden Markov model for a sequence of words or phonemes is made by concatenating the individual trained hidden Markov models for the separate words and phonemes.

Automatic speech recognition systems generally process speech in chunks called utterances (e.g. utterances 228, 226, 224). Often a system is exposed to a series of utterances that can be assumed to be spoken by the same user. Sometimes the system handles just single utterances from each user. Many algorithms have been successfully used to adapt the speech recognition system to the speaker, the acoustic environment, the transmission channel, or the context in general for a series of utterances. However, the challenge for conventional systems is to perform the recognition on the first utterance (228) from speaker 222 as accurately as second or third utterances 226, 224. For the first utterance 228, the information such as speaker's gender or dialect is not readily available. Therefore, the algorithm(s) 230 may not perform as efficiently as desired.

Figure 3:
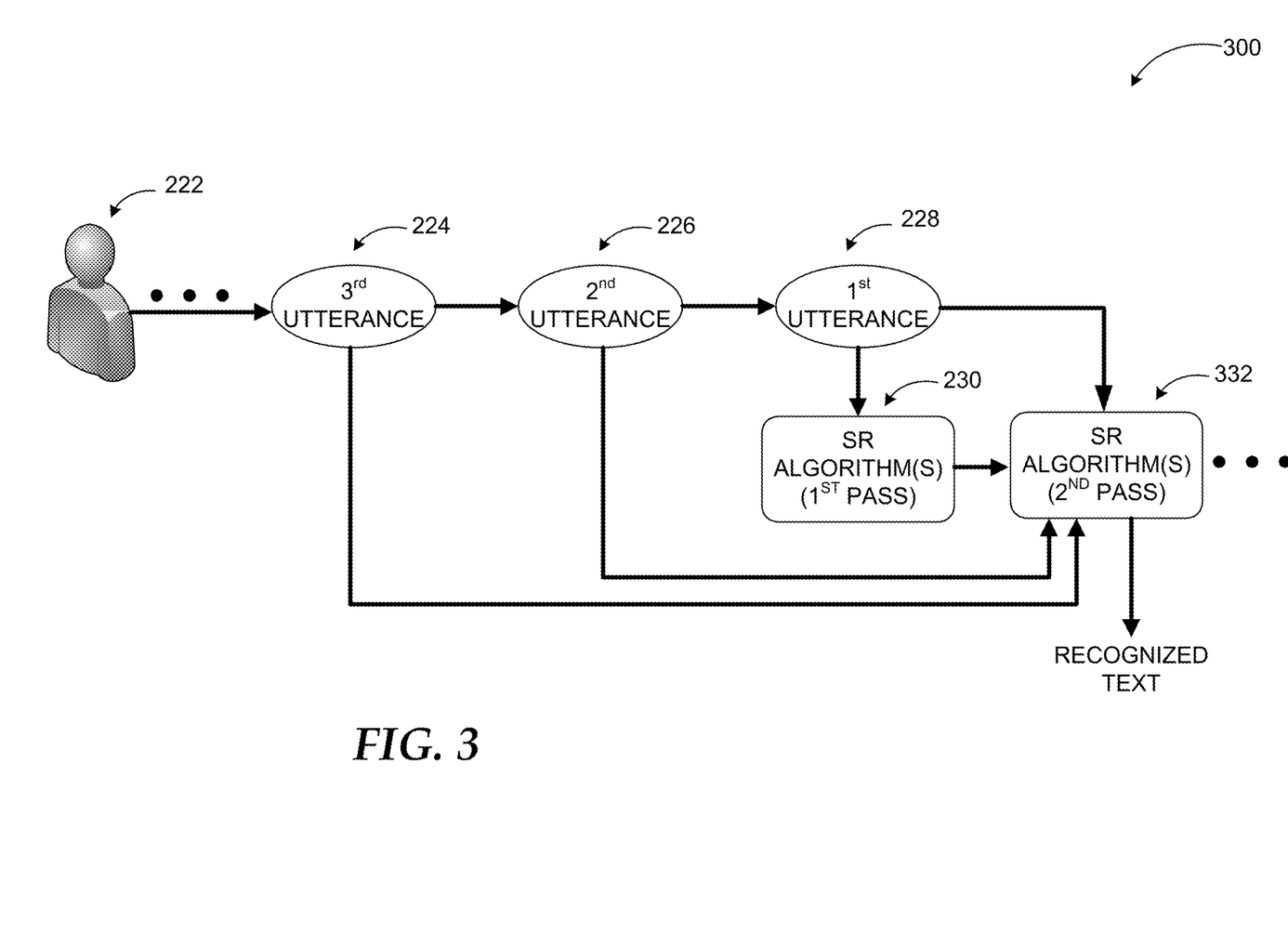
FIG. 3 is a diagram illustrating application of iteratively refined speech recognition algorithms on a first utterance and subsequent utterances in an example speech recognition system according to embodiments.

FIG. 3 is a diagram illustrating application of iteratively refined speech recognition algorithms on a first utterance and subsequent utterances in an example speech recognition system according to embodiments. As discussed above, various algorithms may be employed to adapt the speech recognition system to a speaker. Examples of such algorithms include gender detection, which selects one acoustic model from a finite set of pre-computed models based on the acoustic characteristic of one or more utterances, and 2) feature Maximum Likelihood Linear Regression (fMLLR), which computes a transform on the front end acoustic processing based on one or more utterances. Both algorithms take the speech recognition result as well as the acoustic properties of the utterances as input.

Various combinations of a number of standard techniques may be further utilized to improve recognition performance. For example, context dependency for the phonemes may be employed so that phonemes with different left and right context have different realizations as HMM states. For speaker normalization vocal tract length normalization (VTLN) may be utilized. Other example algorithms include Maximum Likelihood Linear Regression (MLLR) adaptation, eigenvoice adaptation, and mean and variance normalization. Model detection can be exemplified by noise/none noise modeling, gender modeling, accent and dialect modeling. Each of these techniques work on different time scales. An automatic speech recognition system according to embodiments provides a framework for applying them at the right time and in the right order to enhance accuracy and efficiency.

In multistage speech recognition system according to embodiments, for each utterance, a determination is made after running the speech recognition system whether sufficient amount of speech (e.g. first utterance 228) from the speaker 222 exists to apply selected adaptation algorithms 230 in the first pass. If sufficient amount of speech exists, the system is adapted and executed again with the same utterance as input as second pass 332, and so on. By using the constraints derived from the initial pass algorithm 230, the computational costs of subsequent passes is reduced and the overall computational cost and latency of the results is reduced compared to full passes throughout the data. The iterative improvement of the models allows the system to capture more of the speaker and environmental characteristics and more accurately model the subtle differences of the sounds in that particular utterance.

The algorithms applied in a speech recognition system may have dependencies. For example, the fMLLR algorithm depends on the specific choice of acoustic model and thus cannot be applied until after model detection has been completed. Therefore, in a system without multi pass capability employing fMLLR, the earliest application of the algorithms is model detection after the first utterance and fMLLR after the second utterance. Thus, the earliest utterance that can benefit from fMLLR is third utterance 224. In contrast, in a multistage system according to embodiments, the first utterance can be revisited any number of times to get the benefit of any adaptation algorithm if it has sufficient amount of speech to enable that algorithm.

Figure 4:
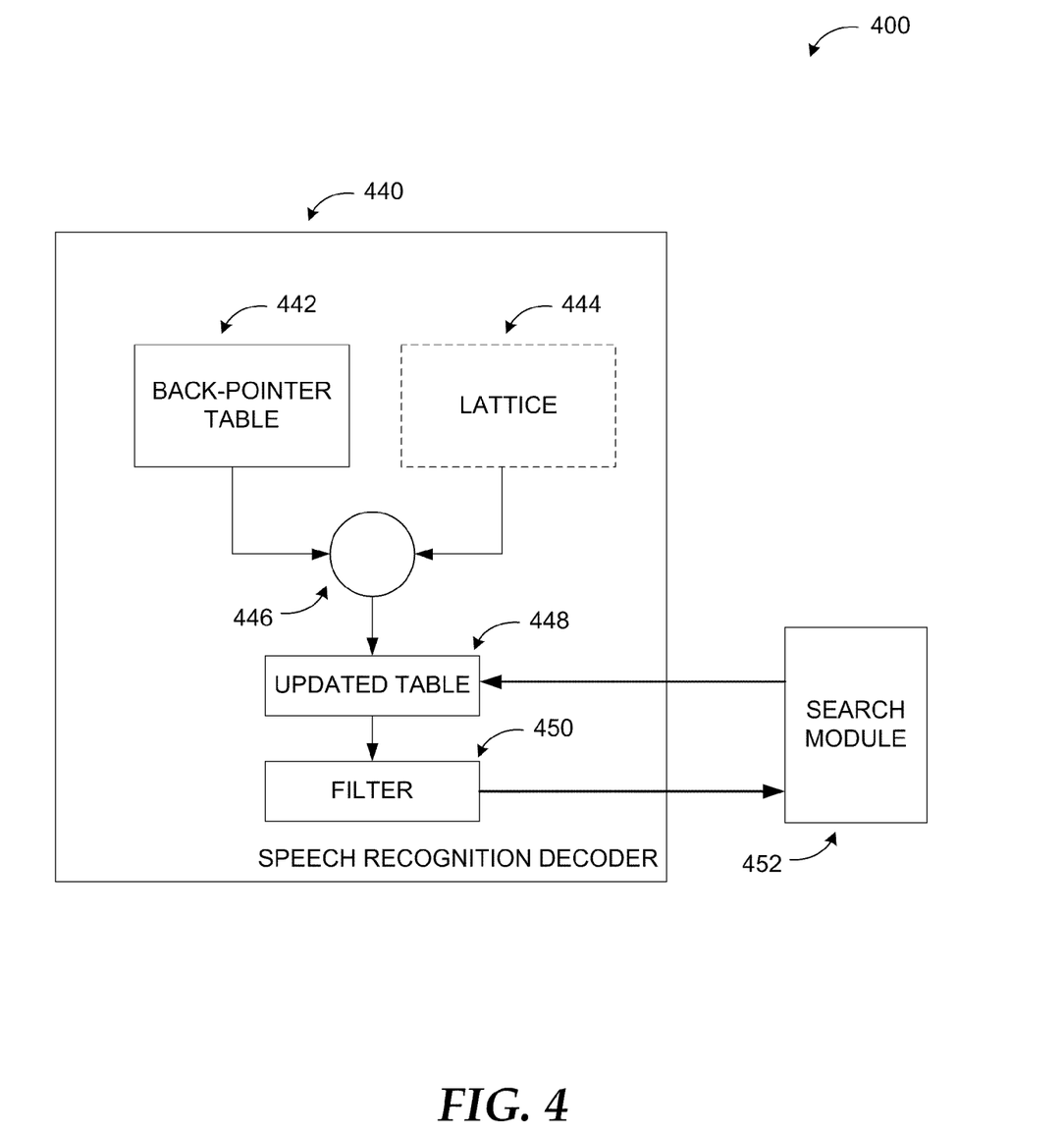
FIG. 4 is a block diagram of major components of a speech recognition decoder according to embodiments.

FIG. 4 is a block diagram 400 of major components of a speech recognition decoder according to embodiments. As discussed previously, the speech recognition process is run once to achieve an initial result for an utterance and this result fed along with the utterance to one or more algorithms that can improve recognition accuracy by modifying (adapting) the speech recognition system to the speaker, the environment, or the context in general. The improved speech recognition system is then re-run on the same utterance to enhance result. Since different algorithms work at different timescales and some may require more than one user utterance to be used, a determination is made regarding which algorithms are to be used and in what order to improve recognition accuracy.

When the speech recognition system has completed the first search pass over an utterance, the back-pointer table 442 in decoder 440 contains information about which words (and at what points in time) were hypothesized and survived the pruning. This information is used to create an index of words that are allowed at each point in time through combination (446) with optional lattice 444 derived from the initial pass recognition. In subsequent passes, for each time point, the set of allowed states in the phonetic network is computed based on the allowed words. This set of allowed states (updated table 448) provides a filter that significantly reduces the search space and, thereby, CPU usage as well as latency. For example, the search space may be limited to a portion of the initial utterance that was deemed to be unclear during the first pass. According to some embodiments, a Bloom filter 450 may be used for fast lookups and a compact size.

Thus, the decoder 440 provides constraints on search module 452. Search module 452 may perform a Viterbi search according to some embodiments employing a Viterbi algorithm to find the best path, and where a combination hidden Markov model including both the acoustic and language model information may be dynamically created. The Viterbi algorithm is a dynamic programming algorithm for finding the most likely sequence of hidden states (the Viterbi path), results in a sequence of observed events, especially in the context of Markov information sources, and more generally, hidden Markov models. The algorithm makes a number of assumptions. First, both the observed events and hidden events must be in a sequence. This sequence often corresponds to time. Second, these two sequences need to be aligned, and an instance of an observed event needs to correspond to exactly one instance of a hidden event. Third, computing the most likely hidden sequence up to a certain point t must depend only on the observed event at point t, and the most likely sequence at point t-1. These assumptions are all satisfied in a first-order Hidden Markov model.

The constraints in subsequent passes may be relaxed or further constrained. For example, one may decide to allow or not to allow a word in subsequent search passes based on the speech recognition system's confidence in that word in the first pass. Additionally, since subsequent passes are generally less computationally intensive, certain aspects of grammars may be relaxed such as allowing larger sets of names, etc. Alternatively, the first pass recognition result may be used to refine the grammar in subsequent passes (e.g., in a song-plus-artist grammar). The subsequent search passes may allow only songs recorded by the artist(s) recognized in the first pass.

The speech recognition systems, components, configurations, and algorithms illustrated above are for example purposes and do not constitute a limitation on embodiments. A speech recognition system with local and remote feedback loops may be implemented with other components and configurations using the principles described herein.

Figure 5:
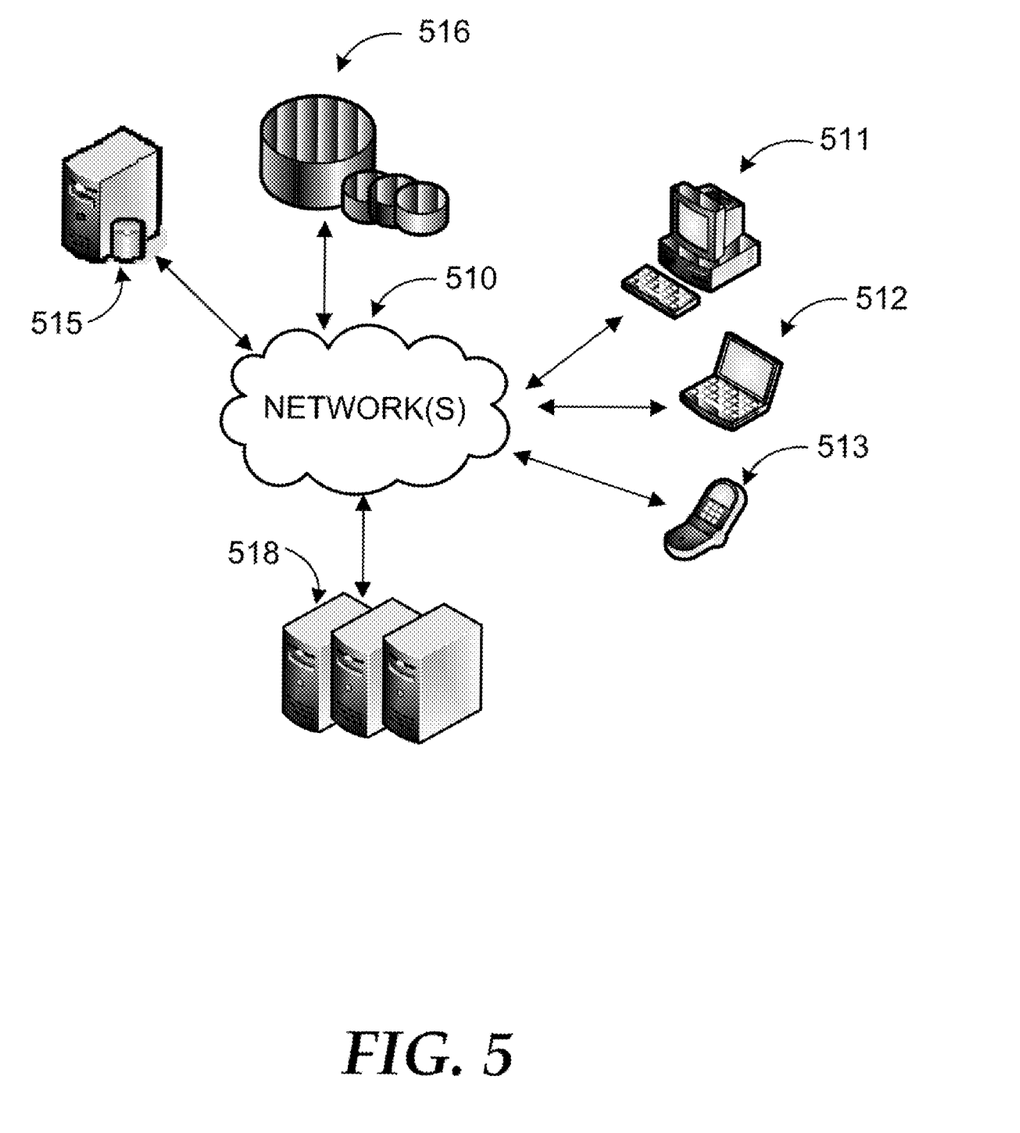
FIG. 5 is a networked environment, where a system according to embodiments may be implemented.

FIG. 5 is an example environment, where embodiments may be implemented. A multistage speech recognition system with iteratively refined algorithms may be implemented via software executed over one or more servers 518 such as a hosted service. The platform may communicate with client applications on individual computing devices such as a cellular phone 513, a laptop computer 512, and desktop computer 511 ('client devices') through network(s) 510.

As discussed previously, client devices 511-513 are used to facilitate communications employing a variety of modes between users of the speech recognition system. Locally or in a distributed manner executed speech recognition applications may perform a first pass recognition on a first utterance received from the user. The application may then perform additional passes constrained and/or adapted based on the results of the first pass on the same utterance. The refined subsequent passes may be applied to following utterances as well. Generated data (e.g. modified models), as well as basic training models, and other speech recognition related data may be stored in one or more data stores (e.g. data store 516), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a multistage speech recognition system with iteratively refined algorithms. Furthermore, the networked environments discussed in FIG. 5 are for illustration purposes only. Embodiments are not limited to the example applications, modules, or processes.

Figure 6:
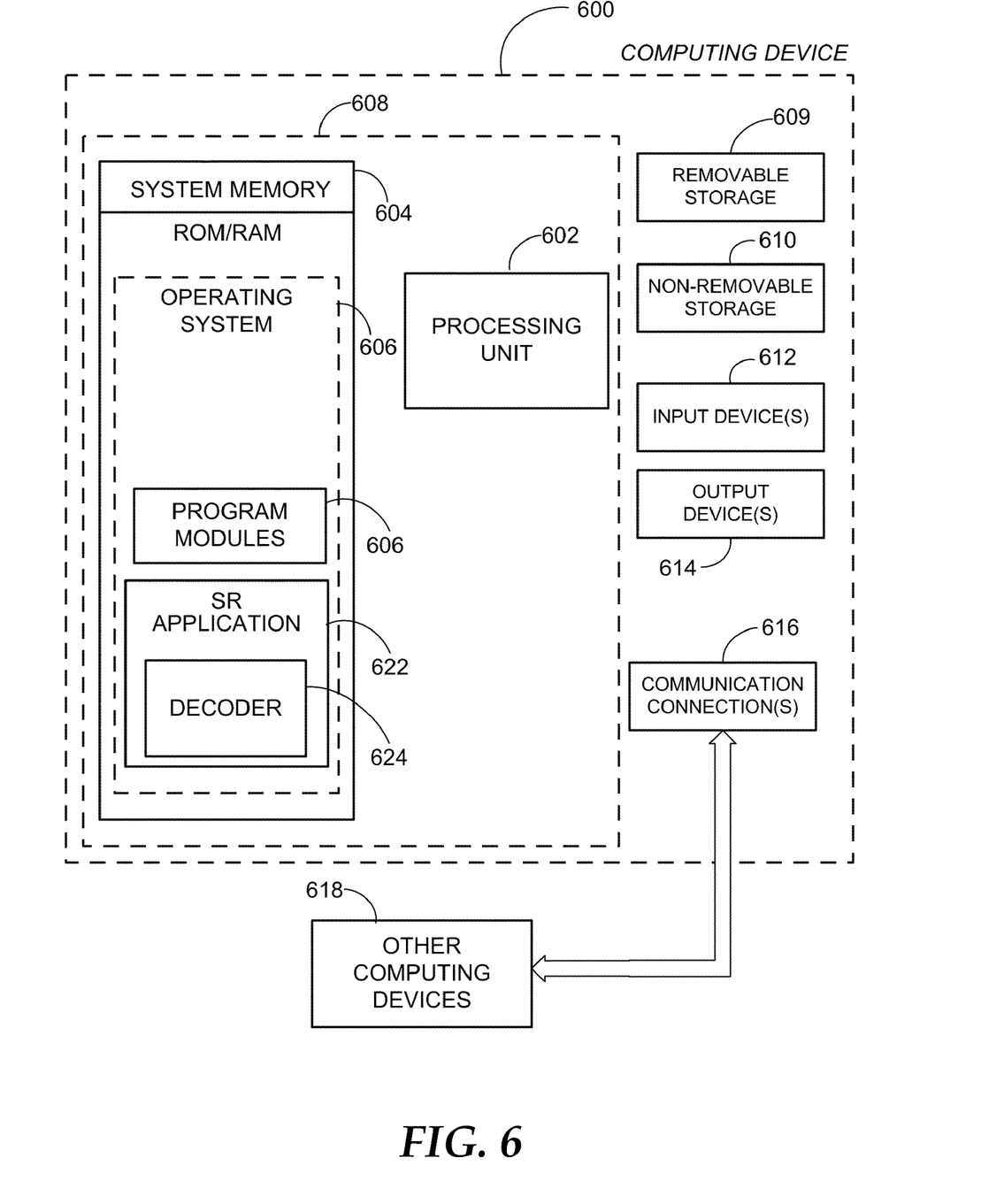
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a client device executing a speech recognition application and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS (operating systems from MICROSOFT CORPORATION of Redmond, Wash. The system memory 604 may also include one or more software applications such as program modules 606, speech recognition application 622, and speech recognition decoder module 624.

Speech recognition application 622 may be any application that performs speech recognition as part of a service as discussed previously. Speech recognition decoder module 624 may be an integral part of speech recognition application 622 or a separate application. Speech recognition decoder module 624 may receive results of a first pass recognition by one or more algorithms and constrain and/or adapt the algorithm(s) for subsequent passes in an iterative fashion while the multiple passes are performed on the same utterance. This increases the accuracy of recognition of the first utterance, as well as the overall system efficiency when the adapted algorithms are applied to subsequent utterances. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 606, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, other directory or presence servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
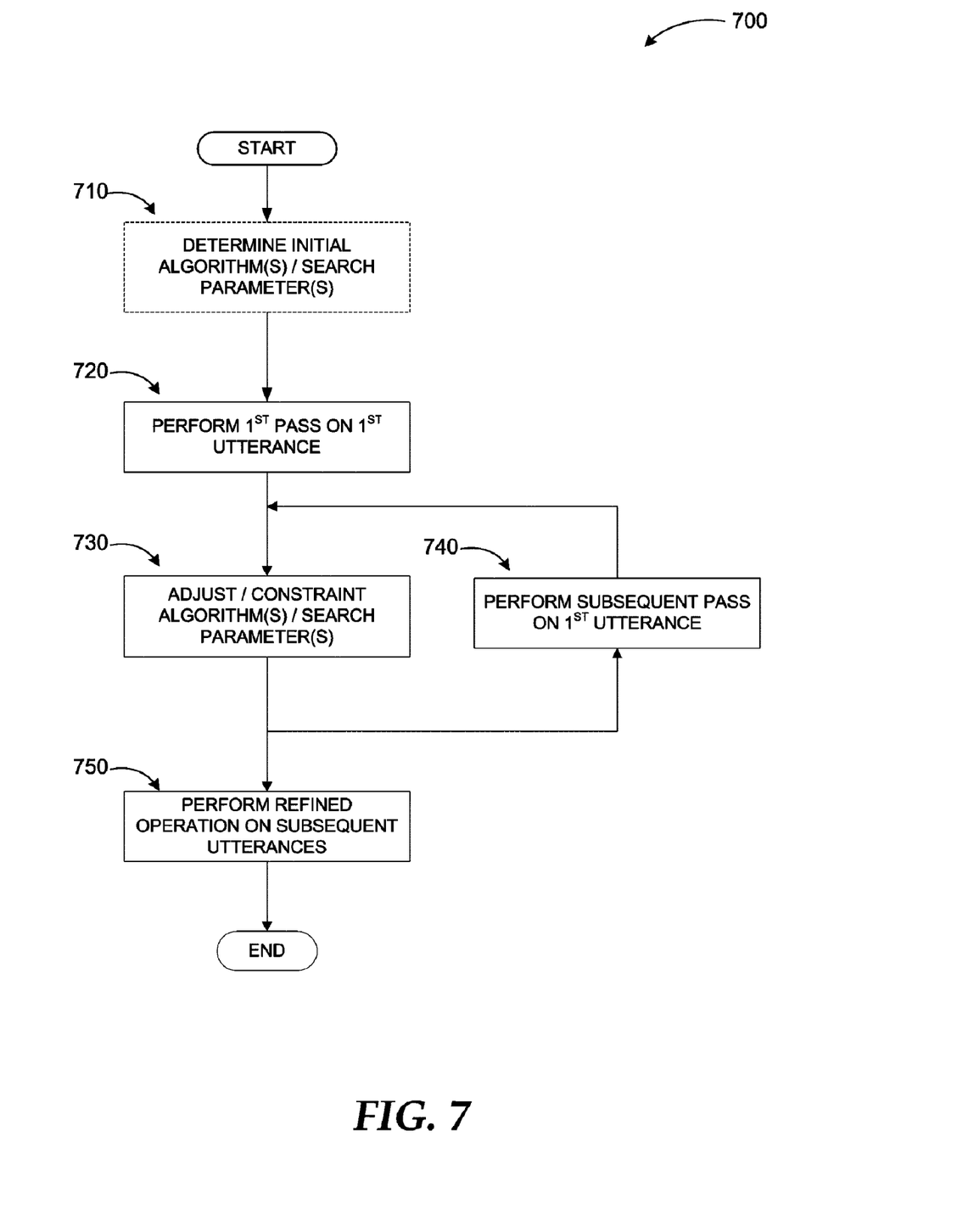
FIG. 7 illustrates a logic flow diagram for implementing progressively adjusted algorithms through multiple passes in a speech recognition system according to embodiments.

FIG. 7 illustrates a logic flow diagram for process 700 of implementing a multistage speech recognition system with iteratively refined passes according to embodiments. Process 700 may be implemented in any speech recognition application.

Process 700 begins with optional operation 710, where initial algorithm(s) to be employed for recognizing the first utterance from the user are determined. The initial algorithm(s) may be default algorithms or selected based on expected user characteristics (e.g. based on user credentials). While example implementations are described herein applying the recognition algorithm adaptation on a first utterance, embodiments are not so limited. Adaptation of speech recognition algorithms through multiple passes on an utterance and subsequent use of the adapted algorithm(s) on other utterances from the same speaker may be implemented on any utterance from the speaker.

At operation 720, a first pass recognition is performed on the first utterance. This is typically a synchronous process, where the recognition is completed by the time the utterance is completed by the user. Important information such as a gender or a dialect of the user may be obtained from the first pass.

At operation 730, the algorithms may be constrained and/or adapted (or even replaced) based on the results of the first pass. Furthermore, acoustic or language models used in conjunction with the algorithms may also be constrained/adapted/replaced based on the results of the first pass. Following the refinement of the algorithms and/or models, subsequent passes may be performed on the same utterance at operation 740 in an iterative manner, where the algorithms are refined further after each pass. This is illustrated in process 700 by the loop from operation 730 to operation 740. The recognition algorithms used in such a system may include, but are not limited to, a gender detection algorithm, a Maximum Likelihood Linear Regression (MLLR) algorithm, a feature MLLR (fMLLR) algorithm, an eigenvoice adaptation algorithm, a mean and variance normalization algorithm, or a Vocal Tract Length Normalization (VTLN) algorithm.

A number of passes and adjustments may be restricted by available resources such as computing capacity and memory, as well as by the complexity and length of the first utterance or a desired quality of speech recognition. According to some embodiments, a dynamic mechanism may determine how many passes are to be employed based on system resources, desired accuracy level, and so on. At operation 750, the refined algorithms may be applied to subsequent utterances received from the user increasing an accuracy and efficiency of the system.

The operations included in process 700 are for illustration purposes. Improving accuracy and efficiency of speech recognition systems through multiple passes on a first utterance may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing multistage speech recognition, the method comprising:
    receiving an utterance from a speaker;
    performing a first pass speech recognition on the utterance employing at least one algorithm including a gender detection algorithm and a feature MLLR (fMLLR) algorithm executed sequentially;
    adapting the at least one algorithm based on a result of the first pass speech recognition;
    performing a second pass speech recognition on the utterance employing the adapted at least one algorithm wherein at least one algorithm is adapted in a progressive manner at the second pass based on a result of the first pass of speech recognition by constraining at least one of an acoustic model and a language model associated with the at least one algorithm, wherein constraining at least one of the acoustic model and the language model associated with the algorithms includes reducing a search space for the at least one algorithm; and
    employing the adapted at least one algorithm for performing speech recognition on subsequent utterances from the same speaker.

2. The method of claim 1, further comprising:
    employing a plurality of algorithms for the first pass speech recognition; and
    modifying a constraint associated with each algorithm employed in the second pass speech recognition based on the result of the first pass speech recognition.

3. The method of claim 2, further comprising:
    modifying a constraint associated with at least one model used by the plurality of algorithms employed in the second pass speech recognition based on the result of the first pass speech recognition.

4. The method of claim 3, wherein the at least one model includes one of an acoustic model and a language model.

5. The method of claim 2, wherein the plurality of algorithms include one at least one from a set of: a gender detection algorithm, a Maximum Likelihood Linear Regression (MLLR) algorithm, a feature MLLR (fMLLR) algorithm, an eigenvoice adaptation algorithm, a mean and variance normalization algorithm, and a Vocal Tract Length Normalization (VTLN) algorithm.

6. The method of claim 2, wherein a timing and an order of the plurality of algorithms for the second pass speech recognition is determined based on the result of the first pass speech recognition.

7. The method of claim 2, further comprising:
    performing a plurality of subsequent passes of speech recognition on the utterance while progressively adapting the plurality of algorithms.

8. The method of claim 7, wherein a number of the subsequent passes of speech recognition is determined dynamically based on at least one from a set of: available computing resources, a length and complexity of the utterance, and a desired quality of the speech recognition.

9. The method of claim 1, wherein the at least one algorithm is adapted to determine at least one from a set of: a speaker attribute, a speaker environment, and a context of the utterance.

10. A speech recognition system for providing multistage speech recognition, the system comprising:
    a computing device executing a speech recognition application, the application including:
        a speech recognition engine for executing a plurality of algorithms to recognize utterances provided by a speaker, the speech recognition engine configured to:
            receive an utterance from a speaker;
            perform a first pass speech recognition on the utterance employing a selected portion of the plurality of algorithms including a gender detection algorithm and an fMLLR algorithm executed sequentially;
            adapt the selected portion of the plurality of algorithms based on a result of the first pass speech recognition by modifying one of: a constraint, a number, and an order of the selected portion of the plurality of algorithms;
            perform subsequent passes of speech recognition on the utterance employing the adapted algorithms, wherein the algorithms are further adapted in a progressive manner at each subsequent pass based on a result of a preceding pass of speech recognition by constraining at least one of an acoustic model and a language model associated with the algorithms, wherein constraining at least one of the acoustic model and the language model associated with the algorithms includes reducing a search space for the algorithms;
            employ the progressively adapted algorithms for performing speech recognition on subsequent utterances from the same speaker; and
            perform a Viterbi search within the search space based on the progressively adapted algorithms.

11. The system of claim 10, wherein the first pass of speech recognition applied to a first utterance and is temporally synchronous with the first utterance.

12. A computer-readable storage medium with instructions stored thereon for providing multistage speech recognition, the instructions comprising:
    receiving a first utterance from a speaker;
    performing a first pass speech recognition on the first utterance employing a plurality of algorithms including a gender detection algorithm and a feature MLLR (fMLLR) algorithm executed sequentially;
    creating an index of allowed words and an associated time point based on a result of the first pass speech recognition;
    adapting the plurality of algorithms by computing a set of allowed states in a phonetic network associated with the algorithms based on the allowed words and reducing a search space for subsequent passes based on the allowed states;
    performing the subsequent passes of speech recognition on the first utterance employing the adapted algorithms, wherein the algorithms are further adapted in a progressive manner by reducing the search space at each subsequent pass based on a result of a preceding pass of speech recognition by constraining at least one of an acoustic model and a language model associated with the algorithms, and wherein constraining at least one of the acoustic model and the language model associated with the algorithms includes reducing a search space for the algorithm;

employing the progressively adapted algorithms for performing speech recognition on subsequent utterances from the same speaker; and performing a Viterbi search within the search space based on the progressively adapted algorithms.

13. The computer-readable medium of claim 12, wherein adapting the algorithms further comprises:

selecting the algorithms from a group of available algorithms; and selecting an order of the algorithms for execution.

14. The computer-readable medium of claim 12, wherein the algorithms use Hidden Markov Model (HMM) based acoustic and language models.

15. The computer-readable medium of claim 12, wherein the algorithms for the first pass are selected based on one of a default set of algorithms and a speaker attribute.

16. The computer-readable medium of claim 12, wherein the search space is reduced to a portion of the first utterance determined to be unclear during the first pass speech recognition.

* * * * *